United States Patent [19]

Ely et al.

[11] 4,291,080
[45] Sep. 22, 1981

[54] SOUND ATTENUATING STRUCTURAL PANEL

[75] Inventors: Richard A. Ely, Dallas; Sherwood W. McClaren, III, Grand Prairie, both of Tex.

[73] Assignee: Vought Corporation, Dallas, Tex.

[21] Appl. No.: 135,388

[22] Filed: Mar. 31, 1980

[51] Int. Cl.³ .............................................. B32B 3/12
[52] U.S. Cl. .................. 428/116; 181/292; 428/131; 428/593
[58] Field of Search ............... 428/116, 117, 118, 131, 428/73, 593; 181/292; 156/197

[56] References Cited

U.S. PATENT DOCUMENTS

| | | | |
|---|---|---|---|
| 3,180,448 | 4/1965 | Gary, Jr. et al. | 52/144 X |
| 3,734,234 | 5/1973 | Wirt | 428/116 X |
| 3,819,009 | 6/1974 | Motsinger | 428/116 X |
| 3,887,031 | 6/1975 | Wirt | 428/178 X |
| 4,001,473 | 1/1977 | Cook | 428/116 |
| 4,084,367 | 4/1978 | Saylor et al. | 428/116 X |

*Primary Examiner*—Henry F. Epstein
*Attorney, Agent, or Firm*—James M. Cate

[57] ABSTRACT

A sound-suppressing panel for use on the surface of a structure adjacent which a fluid is to flow. The panel includes a top sheet (which may be conveniently referred to as a cover) and a bottom sheet, and plurality of walls which are generally perpendicular to the two boundary sheets; the walls have various orientations and intersect one another at various locations so as to form cells which are similar to well-known "honeycomb" cells. Unlike true honeycomb formed by bees, the cells of an optimum construction according to this invention are not uniform. Ideally, there are at least three different cell sizes, and the cells are intermixed (side by side) so that the fluid passing adjacent the cover will sequentially encounter cells of differing sizes. Throughout the cover are provided a plurality of linear passages which permit the fluid which is flowing above the cover to communicate with the plurality of cells below the cover. The diameters of at least some of the linear passages are different from the diameters of adjacent linear passages; ideally, they differ by a factor of at least two, and they may range in diameter from 0.025 to 1.3 centimeters. The ratio of passage length to passage diameter is preferably much less than 10, in order that oscillating fluid within a given passage will not tend to behave like a "fountain" in forcing boundary layer flow upward and away from the cover. The panels have utility as resonating liners for ducts associated with jet engines in aircraft.

21 Claims, 8 Drawing Figures

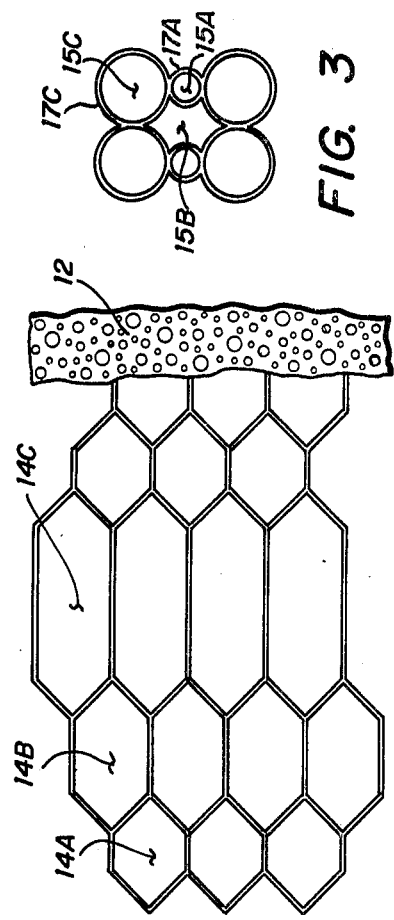
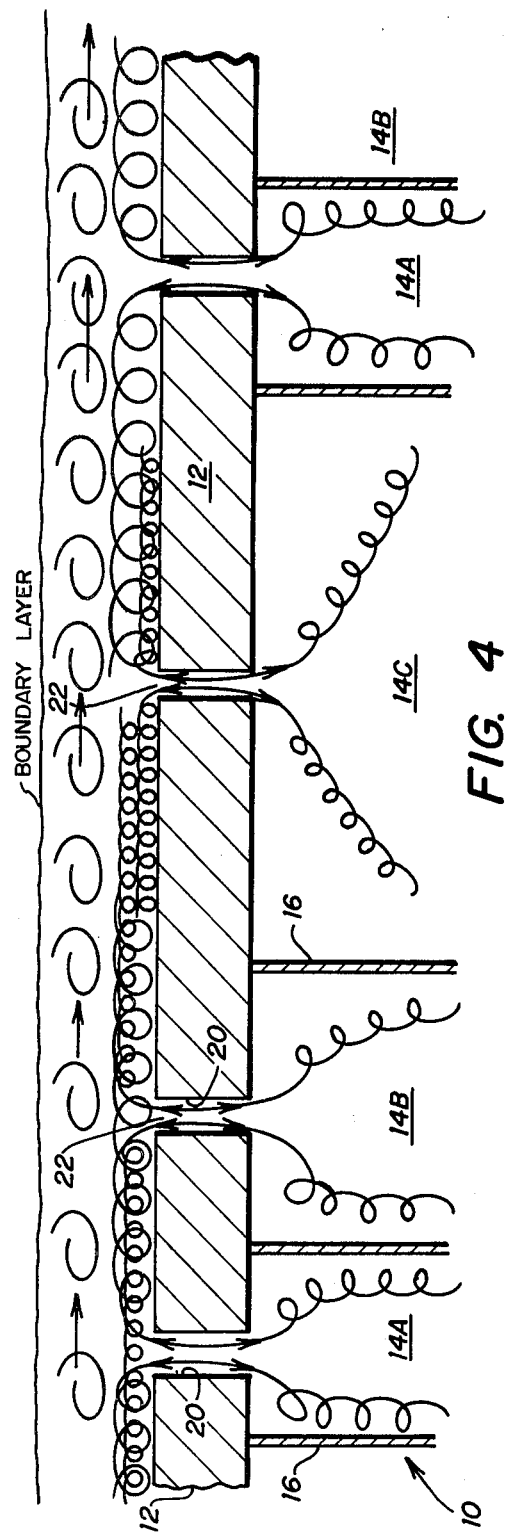

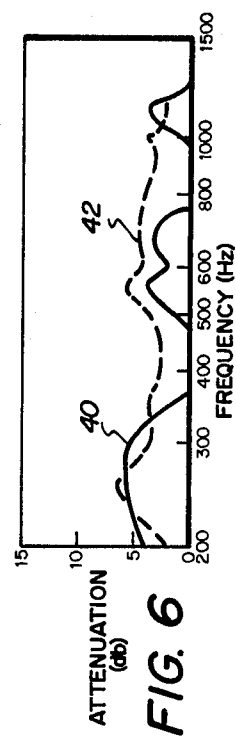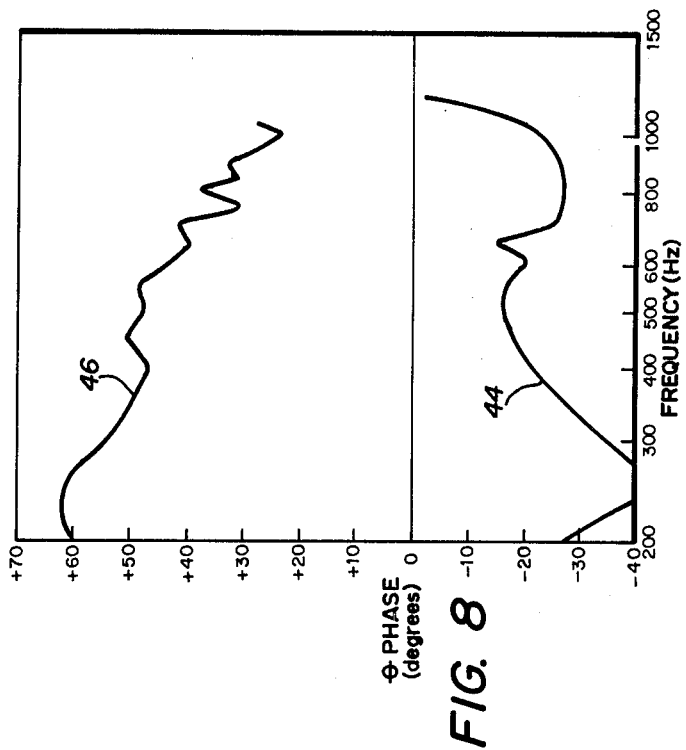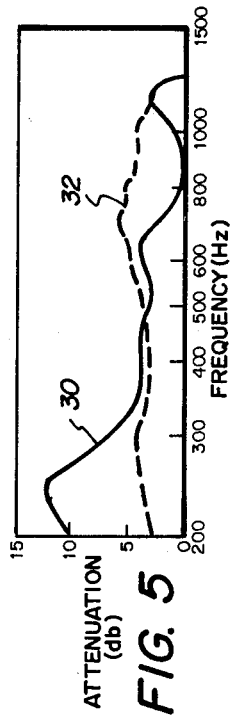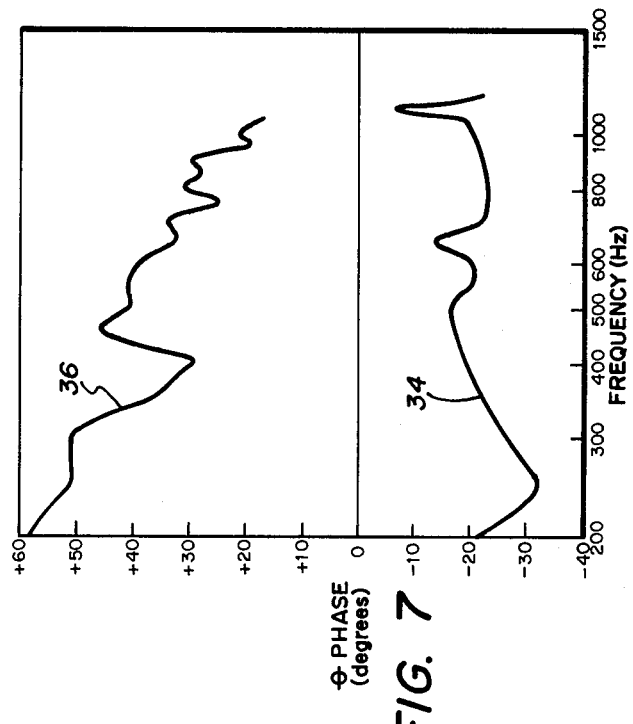

SOUND ATTENUATING STRUCTURAL PANEL

This invention relates generally to sound-absorbing panels, and it relates particularly to a sound-absorbing panel which is adapted to serve as a liner for a passageway through which a fluid is moving. A specific embodiment of the invention relates to panels of the type that are commonly employed in turbojet engine air passages.

There has been extensive work toward reducing the noise which is generated by aircraft engines, and particularly the noise which emanates from the intake and exhaust passages of jet engines. Many patents have issued on constructions which are adapted to suppress noise within engine ducts. Examples of U.S. patents are: U.S. Pat. Nos. 3,819,009 to Montsinger; 3,887,031 to Wirt; and 4,001,473 to Cook.

A common goal of devices in this field is to suppress as much sound as possible and over as wide a frequency band as is possible. An example of the attention given to multiband absorption is found in U.S. Pat. Nos. 3,180,448 to Gary et al, and 3,734,234 to Wirt. The desirability of suppressing sound over a wide range of frequencies has therefore been widely appreciated; and, there have been many proposals which have constituted advances in the art. But, often the proposals for wideband sound absorption have suffered from the disadvantage of being excessively thick in order to achieve their optimum efficacy; or they were designed with such intricate and exotic shapes as to be extremely difficult to manufacture on an assembly line basis. Hence, the economics of *producing* some panels with the materials that are required for a high temperature engine environment have made some designs quite interesting but of doubtful utility. It is an object of this invention, therefore, to provide a sound-suppressing structural panel which is effective over a broad range of frequencies, and which can be manufactured with relative ease—using conventional manufacturing techniques.

It is a further object of this invention to provide a sound-suppressing panel which has a relatively small thickness, considering the range of acoustical attenuation which it provides.

Another object is to provide a resonator panel which has merely a single layer of cavities but which provides results that heretofore have been obtained only with a panel having multi-layer cavities.

Still another object is to provide a technique for noise attenuation in an aircraft engine which minimizes the thickness of the boundary layer that is associated with grazing flow over a structural panel.

These and other objects will be apparent from the description of the several embodiments of the invention and the claims appended thereto, and the attached drawing in which FIG. 1 is a perspective view of an exemplary single-layer panel having three different sizes of side-by-side cavities;

FIG. 2 is a top plan view of an array of exemplary cells, with three different sizes being shown in this embodiment;

FIG. 3 is a top plan view of an array of circular cells which are arranged to produce another irregularly sized "cell" in the space between adjacent circular cells;

FIG. 4 is an enlarged, cross-sectional, elevational view of a segment of a panel, with three different cells being shown;

FIG. 5 is a graphical representation of the attenuation of two different panels, one of which is a three-layer panel characteristic of the prior art, and the other being a single-layer panel with a variety of cell sizes and apertures—made in accordance with this invention;

FIG. 6 is a plot of certain test data with regard to the same two panels which gave the test results of FIG. 5, except that the results of FIG. 6 are for higher airflow (Mach 0.33) than the flow of FIG. 5 (Mach 0.16);

FIG. 7 is a plot of the respective phase angles (between acoustical pressure and particle velocity, as measured against time) with respect to the two panels whose results were represented in FIGS. 5 and 6—the phase angle being an indicator of whether the system is either compliant or inertive; and FIG. 8 is a plot similar to FIG. 7, except that the flow rate is again high (Mach 0.33) as compared with FIG. 7 (Mach 0.16).

In brief, the invention includes a sound-suppressing panel for use on the surface of a structure adjacent which a fluid is to flow. The panel includes a top sheet (which may be conveniently referred to as a cover) and a bottom sheet, and a plurality of walls which are generally perpendicular to the two sheets; the walls have various orientations and intersect one another at various locations so as to form cells which are similar to well-known "honeycomb" cells. But, unlike true honeycomb formed by bees, the cells of an optimum construction according to this invention are not uniform. Ideally, there are at least three different sizes of cells, and the cells are intermixed (side by side) so that the fluid passing adjacent the cover will sequentially encounter cells of differing sizes. Throughout the cover are provided a plurality of linear passages which permit the fluid which is flowing above the cover to communicate with the plurality of cells below the cover. And, most importantly, the diameters of at least some of the linear passages are different from the diameters of adjacent linear passages. Ideally, the diameters of the linear passage differ by a factor of at least two, and they may range in diameter from 0.025 to 1.3 centimeters. The ratio of passage length to passage diameter is preferably much less than 10, in order that oscillating fluid within a given passage will not tend to behave like a "fountain" in forcing boundary layer flow upward and away from the cover.

Referring initially to FIG. 1, a section of sound-suppressing panel 10 is shown with a substantial segment of the cover 12 being broken away in order to better illustrate the underlying cells 14. This preferred embodiment of the structural panel 10 includes three different sized cells: a small cell 14A, a medium-sized cell 14B and a large cell 14C. Each of the cell walls 16 extends from the cover 12 to a bottom sheet 18, and each wall is normally secured by brazing or the like to both the top and bottom sheets, so as to form a structurally stable panel. Conventional manufacturing techniques may be employed to form the honeycomb panel 10, so that exotic tooling and/or special fasteners are not required. As shown, the walls 16 have various orientations and they intersect one another at various locations; and the walls have generally uniform heights—such that the cells 14 have a generally common height. In certain embodiments for aircraft engines and the like, it may be necessary or appropriate to make a given portion of the panel somewhat thicker or thinner—for airflow considerations or to provide room for some supporting member in the aircraft. Providing a variation in the separation distance between the top and bottom sheets is permissible in accordance with this invention (without unduly affecting its efficacy). However, it has been found that the volume of each cell in the array of multi-sized cells 14 should be at least 0.01 cm$^3$; and, for aircraft installations, a maximum size of about 16 cm$^3$ for each cell is recommended.

Referring next to FIG. 2, which is a top view of an exemplary array of cells 14, the smallest cell 14A has a cross-sectional area of 0.035 in$^2$, which is particularly appropriate for suppressing noise at a frequency of about 8280 hertz. (8280 hertz is three times the blade passage frequency of a typical turbofan engine at take-off conditions.) The medium cell 14B has a cross-sectional area of 0.085 in$^2$, which is appropriate for suppressing noise at about 5520 hertz. The large cell 14C has a cross-sectional area of 0.14 in$^2$, which may be considered to be "tuned" for suppressing noise at 2760 hertz. As will be explained more fully herein, the three cells 14A, 14B, 14C in FIG. 2 are effective in suppressing noise at frequencies other than the three specified frequencies, by virtue of the variety of apertures which are provided in the cover 12.

While the straight-sided cells 14 illustrated in FIG. 2 are normally the easiest kinds of cells to manufacture (regardless of whether the cells have two walls, six walls or eight walls), it is also possible to produce a panel in accordance with this invention which has curved walls—as shown in FIG. 3. In the curved-wall embodiment, the smallest cell 15A can be formed from a segment of a small tube 17A, and the largest cell 15C from a substantially larger tube 17C. When the small tube is used as a separator between rows of larger tube segments, the space between two small tube segments effectively becomes a third cell 15B whose size is intermediate the small and large cells. Such a round-cell construction gives an excellent mixture of multi-sized cells for the fluid flow, regardless of the direction of that flow. And, the fluid flow will sequentially encounter cells of different sizes just as surely with the curved-wall embodiment as with the straight-wall embodiment.

Referring next to FIG. 4, the geometry for a few cells will be examined, with only a small number of linear passages being illustrated (for clarity's sake). In FIG. 4, the smallest cell 14A has a dimension in the direction of fluid flow of about one-fourth inch; the medium cell 14B has a corresponding dimension of three-eighths inch, and the largest cell 14C has a dimension of three-fourths inch in the same direction. Immediately downstream of the largest cell 14C will naturally be another series of small, medium and large cells, with each series of cells being typically repeated for the full length of the structural panel 10. The cover sheet 12 over the various cells is shown to have a plurality of linear passages 20 which permit the fluid flow above the cover to communicate with the cells below said cover. As shown, the diameters of the passages 20 are not identical, and they typically range from 0.025 cm to 1.3 cm. At a minimum, the diameters of various passages should differ by a factor of at least two, in order that there will be at least some variety in the sound-suppressing effect which is realized from the linear passages themselves, as well as the size of the various cells. While only one linear passage has been shown in association with each cell, there will normally be several such passages extending through the cover and terminating in each cell. A preferred density for the linear passages is at least one passage per square centimeter of cover surface area, in order to promote an optimum action in the boundary layer above the cover 12. It will be apparent that the linear passages 20 terminate at the top of the cover 12 in apertures 22; and the separation of said apertures is ideally less than 10 times the diameter of the smaller of two adjacent apertures. Such an arrangement has been found to provide surprisingly efficient attenuation of the noise emanating from an aircraft engine. What is believed to be the basis for this efficiency will be explained in more detail hereinafter.

Continuing with a description of the structural features of the invention, the length of the linear passages 20 is believed to be particularly significant in optimizing a given panel, and the ratio of passage length to passage diameter should be within the range of about 1 to 10. If the length-to-diameter ratio exceeds 10, any resonant flow of fluid out of a given cell would tend to push the boundary layer away from the cover 12, and this would only bring about deleterious effects in the boundary layer.

In addition to some criticality in the length-to-diameter ratio of the passages 20, the angle at which the linear passages intersect the top of the cover 12 is also important—because a sharp (e.g., 90 degree) intersection is more efficient in generating the vortices which have utility in converting acoustic energy into heat. A bell-shaped or "rounded" opening at the top of the linear passages would contribute to a more tranquil mixing of any flow out of a linear passage; and, when it comes to dissipating acoustic energy, a graduated smooth mixing is not as efficient as a turbulent mixing. Although heat is naturally generated by a turbulent reaction when there is a large reduction in sound pressure, the amount of heat is not significant in comparison to the total heat capacity of the flowing airstream. Thus, no substantial temperature changes are likely to occur in that airstream. Any increase in resistance to flow (drag) of the grazing fluid which is due to increased viscous losses is more than offset by the smoothing effect of diminished oscillatory disturbances.

In an evaluation of the construction enclosed herein, it has been determined that the disturbances generated by flow out of the orifices 22 extend radially outward (in all directions) for as much as 10 orifice diameters, so there is significant "entanglement" of vortices from adjacent holes. And, since an orifice is—by definition—a *short* low channel, there is relatively little "training" of a fluid during its passage through an orifice. As far as the fluid is concerned, the orifice is essentially all entrance and all exit. That is, there is no significant "jet" or "fountain" effect which would tend to push a boundary layer away from a perforated cover sheet 12.

If there should ever be an arbitrary limit of only one word which could be employed to characterize the system disclosed herein, the most logical choice for that one word would be "variety", although it is both thinness and variety that make the construction noteworthy. Variety, of course, is an appropriate word to use because the preferred embodiment of the invention includes a plurality of linear passages having many different diameters, and the various passages extend into a set of differently sized (but side-by-side) cells in a single layer. Of course, others have proposed using multi-sized cells which are stacked one upon the other; but any such construction will obviously be significantly thicker than a side-by-side arrangement. Too, others have proposed constructions which have several layers of cells, with the respective sheets between various layers having their own uniquely sized orifices. But, so far as is known, there has not been any suggestion of a variety of differently sized cells which are accessed by differently sized holes in a single sheet which is immediately adjacent the fluid flow. And, it has been found that the interaction of the various oscillatory flows (through a mixture of adjacent holes at different frequencies and velocities) appears to produce surprisingly high viscous flow losses; these losses are in some cases even greater than those which are claimed for much thicker multi-layer panels. The examples of sound attenuation that are illustrated by some of the constructions described herein clearly suggest that non-linear interactions among vortices between non-uniform orifices produce an unexpected benefit. Perhaps it should be mentioned here, though, that the plurality of what may appear to be randomly spaced orifices is not in any way equivalent to the results that would be obtained by a fluid flowing over a quantity of porous mineral wool or other non-linear material. That is, mineral wool and similar materials have been recognized as having sound-absorbing qualities under certain conditions. But, mineral wool does not have the *linear* passages that are provided in the constructions described herein; and neither do any of the "openings" into mineral wool fit the definition of the orifices that are referred to herein.

The panel 10 shown in FIG. 1 is obviously intended to represent a flat panel, and both the cell walls and the plurality of linear passages are generally parallel. However, a panel in accordance with this invention could be made so as to be generally cylindrical, and the walls and linear passages would then be oriented so as to extend radially outward from the longitudinal axis of the panel. Other shapes could also be utilized to form a resonator panel, depending on space requirements, etc. The material from which the panel 10 would be fabricated would routinely be selected in accordance with the environment in which the panel is to operate. For use in aircraft, a material such as aluminum, stainless steel, titanium, etc., may be employed for both the walls 16 and the sheets 12, 18. In general, the walls will be sealingly joined to both the top and bottom sheets, so that each cell will react independently to the pressure of fluid passing over the cover. By using substantially rigid material for the cover, the bottom sheet and the walls, the cells which are created by joining those elements will have a rigidly fixed volume. Oscillatory flow of a fluid through the linear passages 20 will thus be between a steady grazing flow over the cover 12 and a plurality of fixed-volume cells under said cover.

It has been learned that the specific shape of the cavities below a cover 12 does not materially affect the performance of an attenuation panel 10—as long as the wavelength of the sound that is incident upon a panel is large in comparison with the dimension of the cavities. Of course, this is almost always the case with sound suppression in aircraft. There are certain limits, however, on the volume and depth of the cavities in order to foster maximum sound attenuation, and those parameters have been discussed elsewhere herein. FIGS. 5, 6, 7 & 8 present actual performance data for acoustical panels made in accordance with this invention; and for comparison, the performance of a representative panel made in accordance with the prior art is also shown.

The linear passages having a desired quantity and spacing can be provided in a cover 12 at any appropriate time, depending upon the material that is being employed and the manufacturing technique which is to be used to create these passages. If conventional drilling is to be employed, then the chips from such drilling must be contemplated, and the work should probably be done before the cover is affixed to the remaining structural elements. However, if a technique employing lasers or other devices which essentially vaporize the material, then the linear passages could be formed after the structural pieces are secured together. Perhaps it should also be mentioned that the preferred embodiment of the invention is a single-layer embodiment; but this should not be taken as precluding the possibility of a multi-tier panel in which a second (or third) set of cells is placed underneath the first set of cells. A perforated septum would naturally be provided between the respective layers of cells, and a sound-impervious closure sheet would be provided at the bottom of the entire assembly.

To help explain the concept which is being disclosed herein, the results of some comparative tests will now be considered. Referring next to FIG. 5, which is a plot of the acoustical attenuation achieved by a single-layer construction in accordance with this invention and the attenuation achieved by an equivalent three-layer construction. Both test panels had a length of 15 inches, and the entry sound pressure level was measured at 155 dB; the grazing flow of air over the panel was at Mach 0.16. It will be obvious from examining FIG. 5 that at relatively low frequencies (e.g., 200–300 Hertz) the attenuation of the single-layer panel represented by line 32 was less than the attenuation for the three-layer panel represented by line 30. But, this difference was anticipated, and it was essentially inevitable because the sizes of the cells were established to foster ease in the manual fabrication of the test panels—not optimum low frequency attenuation. With automated equipment and different fabrication techniques, the cell dimensions could be altered and the attenuation at low frequencies improved. It should be noted, though, that the figure shows that the single-layer panel provided more attenuation over half of the designed frequency range than was provided by the baseline three-layer panel.

FIG. 6 is a plot of test results for the same panels which were utilized in the tests of FIG. 5, the difference being that a higher grazing flow (Mach 0.33) was established. This particular plot more clearly reveals the efficacy of the construction shown herein—especially with regard to filling in the "gaps" of attenuation between certain resonant frequencies. It should be readily apparent, then, that a single-layer panel in accordance with this invention can produce results (indicated by broken line 42) that are superior to multi-layer panels of the prior art (solid line 40).

Other measurements obtained during the tests depicted in FIGS. 5 and 6 are believed to be of even greater significance; these are the measurements of phase angles which are represented in FIGS. 7 and 8. By using a gradient microphone, it is possible to obtain information about the velocity of particles moving over a test panel as well as the accompanying acoustical pressure. By sensing both the particle velocity generated by a sound wave and independently measuring the pressure associated with that sound wave, it is possible (with electronic instrumentation) to determine the phase angle, which is a measure of the time delay between the oscillatory particle velocity and the oscillatory pressure, That is, the phase angle is a measure of the time delay between pressure fluctuation and velocity fluctuation, with a positive phase angle being indicative of an inertive reactance. In a system which is controlled by compressive or elastic forces, the sound pressure will come afteer the particle velocity—in time. In other words, particle velocity will be a maximum after sound pressure is a maximum—in time, and the phase angle will be negative. Determining whether the pressure leads or lags the particle velocity will reveal whether a given system may be characterized as a compliant (or elastic) system, or inertive system, i.e., one that is controlled primarily by mass and density. The conventional three-layer panel, wherein vertically stacked cells communicate through septa, will give a major reactance which is negative. That is, the phase angle between the pressure and the particle velocity is negative, as seen in FIG. 7 as line 34. When similar measurements are made on a single-layer panel as disclosed herein, the sign of the phase angle 36 has reversed and a positive value is obtained, so that the presence of an inertive field is clearly indicated. Of course, the presence of an inertive field is an indication that there is a highly turbulent flow which is present; and that turbulent flow leads to the conclusion that there is a substantial interaction among the various vortices that are present. This enhanced interaction (or "tangling up" of the various vortices) has the effect of increasing the effective mass, which is believed to contribute to the apparent positive reactance. Expressed more simply, a sound wave passing over a panel 10 is, in effect, seeing more resistance because of the necessity to move an "increased" mass of air, as compared to the resistance it faced when it passed over a three-layer panel having negative reactance characteristics. When a sound wave is working against an air layer which is characterized by having "springiness", then the mass of that air is essentially negligible; and the air mass has a tendency to be elastic and to easily move away from the panel. On the other hand, when the sound wave encounters an air mass adjacent a panel which is inertive, significant energy is required in order to pass over such a panel. The net result, of course, is to attenuate the sound which is being affected by the adjacent structural panel.

FIG. 8 shows the positive phase angles of data from a single-layer panel (indicated by line 46), while the three-layer panel of the prior art provided negative phase angles indicated by line 44. The data shown in FIG. 7 correspond to the low-flow data of FIG. 5, and the high-flow data in FIGS. 6 and 8 are similarly paired.

The oscillatory flow of fluid through the plurality of differently sized, parallel passages 20 naturally results in the conversion of substantial acoustic energy into heat. But, with a metallic cover 12 being on the high end of the preferred range of thickness (0.025 to 0.25 cm), there will be a sufficient mass of metal to adequately handle any expected heat conditions. And, by insuring that there are ample small cells (e.g., 0.01 cm$^3$), there will be sufficient walls 16 to foster the transfer of heat by conduction from the cover 12 to the base 18. The walls 16 will normally not exceed a maximum of 2.5 cm in height, so there is a relatively short distance for heat to be conducted to the cool base 18.

To perhaps better explain the process of selecting an optimum set of cell sizes, an exemplary design routine will now be described. Assuming that a sound-suppressing panel is to be designed for an aircraft application, and assuming that a turbo-fan engine such as a General Electric CF6 or CF34 is to be utilized, sound in the range of 200 Hertz through 9,000 Hertz would be the primary frequency range of offensive noise. (Below 200 Hertz, air-borne sound does not radiate very well from engine enclosures and ducts, and the sensitivity of a normal human ear is relatively low; hence, 200 Hertz is a realistic lower limit for a design parameter. Above 9,000 Hertz, atmospheric absorption tends to attenuate sounds in relatively short distances, and the sensitivity of a normal human ear also begins to decrease rather dramatically. Also, most noise generators such as aircraft engines seldom produce significant noise above 9,000 Hertz; hence, it is realistic to establish 9,000 Hertz as an upper limit for design consideration.)

Turning first to the low end of the range of frequencies, it is preferable to establish a maximum cell size which is compatible with other realistic parameters. Assuming that there is be only a single passage 20 of very small size in a cover sheet 12 having a minimal practical thickness, a rough value for cell volume can be approximated by using the equations found in *Mechanical Radiation by R. B. Lindsay, published by McGraw-Hill Book Co., Inc., of New York, New York in* 1960 (beginning at page 237). For example, a single passage having a diameter of 0.025 cm in a cover sheet having a thickness of 0.025 cm for attenuating sound at 200 Hertz in air would require a cell volume of approximately 16 cm$^3$. Increasing the diameter of the hole in such a thin cover would tend to reduce any attenuation benefits, because eventually the oscillating air in said passage will not really be affected by the passage, per se. Also relatively large holes in thin sheets obviously will tend to reduce the stiffness and structural integrity of such sheets. Having arrived at 16 cm$^3$ as the largest cell size, and assuming that three different cell sizes are to be employed (in order to realize the most benefit from the concepts described herein), then two smaller cell sizes would typically be selected in order to achieve simultaneous attenuation at frequencies higher than 200 Hertz, e.g., 400 or 800 Hertz.

It is possible, of course, that the cover sheet 12 would need to be substantially thicker than 0.025 cm, such that the length of the passage 20 could become relatively long in comparison with the passage diameter. Remembering that an orifice begins to act like a tube when the length-to-diameter ratio exceeds 10, the diameter of optimum passages will naturally be increased as cover thicknesses are increased. With numerous relatively large apertures 22, a point will eventually be reached at which there is simply not enough surface area to provide the tentative number of calculated orifices. It follows then, that the thickness of the cover sheet must not become too great, or there will not be enough room for a number of relatively large orifices. If calculations dictate that there should be a certain amount of open area in the cover sheet and there is not enough room for a plurality of uniformally sized apertures over a particular cell, then a plurality of differently sized apertures leading into a single cell can be employed, as shown in FIG. 2. Alternatively, the diameters of a given set of passages into one cell can be reduced so that the desired number of *uniform* passages can be provided in a single cell. In general, results with experimental panels have revealed that the optimum cover sheets for sound-attenuation panels in accordance with this invention should be within the range of 0.025 cm to 0.25 cm thick.

Having established the parameters of cover thickness, passage diameter, and percent open area for a given panel, it would be reasonable to next consider what cell volume would be appropriate for optimally attenuating sound at 9,000 Hertz. The selection of a maximum cover thickness has the effect of forcing the cell volume to minimum values for attenuation of sound at 9,000 Hertz. Using the *approximate* equations given in the aforementioned book *Mechanical Radiation*, it can be shown that a minimum cell volume should be about 0.01 cm$^3$—for attenuation of sound at 9,000 Hertz in air. Hence, by providing at least two different cells whose linear extent differs by a ratio of approximately 45:1, frequencies within the range of about 200–9,000 Hertz can be adequately attenuated.

While only the preferred embodiment (and a few modifications thereof) have been disclosed in great detail herein, it should be apparent to those skilled in the art that still additional modifications could be made without departing from the spirit of invention. For example, the variety of linear passages, cell shapes and sizes, wall thicknesses and orientations, etc., may be selected by a stilled designer in order to optimize a sound-suppressing panel for a given environment. Also, it is believed that at least three differently sized cells offer such significant advantages that putting only two differently sized cells in a given panel would be sacrificing an untoward amount of performance in order to perhaps save on tooling expense or the like. However, if it should seem to be advantageous to include alternating sets of only two differently sized cells in a panel, there is no reason why this might not be feasible. Furthermore, it should be understood that curved panels as well as flat panels are equally adaptable to the concepts disclosed herein, as long as the cells have a generally transverse orientation with respect to the fluid passing over the cover sheet. Accordingly, the invention should be understood to be as broad as the scope of the claims appended hereto.

What is claimed is:

1. A sound-suppressing panel for use on a structure adjacent which a fluid is to flow and upon which sound waves impinge, comprising:
    (a) a top sheet forming a cover, adjacent which a fluid flow is adapted to pass and cause a turbulent boundary layer of fluid to be in direct contact with the cover, and there being a plurality of linear passages through the cover, and the separation of adjacent passages being no more than about ten times the diameter of the smaller of any two adjacent passages;
    (b) a bottom sheet;
    (c) a plurality of walls extending between the bottom sheet and the top sheet, and the walls having various orientations and intersecting one another at various locations so as to form cells, and the walls having different dimensions so as to create at least two differently sized cells, and each cell having a characteristic frequency which is determined by the cell volume and the size and quantity of linear passages leading into a respective cell, and there being combinations of cell and passage sizes so as to produce at least two different characteristic frequencies associated with sound-induced oscillatory flow through the linear passages;
    (d) and the cells being arranged in a side-by-side fashion, with differently sized cells being positioned adjacent one another, and the linear passages also being located adjacent each other so as to insure that the localized vortices associated with the sound-induced oscillatory flow through a respective linear passage interacts with the localized oscillatory flow through the adjacent linear passages, whereby the intermixing of vortices generated by adjacent linear passages contributes to an enhanced mixing of said localized vortices with the turbulent boundary layer flow that is passing over said vortices.

2. The sound-suppressing panel as claimed in claim 1 wherein there are linear passages through the cover whose diameters differ by a factor of at least two, whereby a wide-band sound-suppressing effect is achieved by a significant variation in passage diameters as well as a variety of cell sizes.

3. The sound-suppressing panel as claimed in claim 1 wherein the diameters of the plurality of linear passages range from 0.025 cm to 1.3 cm.

4. The sound-suppressing panel as claimed in claim 1 wherein the density of the linear passages is at least one per square centimeter of cover surface area.

5. The sound-suppressing panel as claimed in claim 1 wherein the intersections of the linear passages with the top of the cover form sharp corners having included angles of approximately 90 degrees.

6. The sound-suppressing panel as claimed in claim 1 wherein there are at least three different sizes of side-by-side cells in a single layer of cells below the cover, and there are passages with different diameters associated with each of the cell sizes, whereby there are at least three characteristic frequencies which are associated with a single-layer panel.

7. The sound-suppressing panel as claimed in claim 1 wherein the ratio of passage length to passage diameter is within the range of about 1 to 10.

8. The sound-suppressing panel as claimed in claim 7 wherein the panel is generally flat and the plurality of linear passages are parallel.

9. The sound-suppressing panel as claimed in claim 7 wherein the panel is generally cylindrical, and the linear passages are oriented so as to extend radially outward from the longitudinal axis of the panel.

10. The sound-suppressing panel as claimed in claim 1 wherein the cells have a honeycomb-type transverse cross section, with each cell having at least four sides.

11. The sound-suppressing panel as claimed in claim 1 wherein the walls are sealingly joined to both the top and bottom sheets so that each cell reacts independently to the pressure of a fluid passing over the cover.

12. The sound-suppressing panel as claimed in claim 1 wherein the volume of each of the cells is at least 0.01 cm$^3$ but not much more than about 16 cm$^3$.

13. The sound-suppressing panel as claimed in claim 1 wherein the cover, the bottom sheet, and the walls are all substantially rigid, such that the cells have a rigidly fixed volume.

14. The sound-suppressing panel as claimed in claim 1 wherein the cover is within the range of 0.025 cm to 0.25 cm thick, such that the linear passages are within the range of 0.025 cm to 0.25 cm long.

15. The sound-suppressing panel as claimed in claim 1 wherein the top and bottom sheets are separated by no more than 2.5 cm, so that the walls are no more than 2.5 cm in length and the cells have a depth of no more than 2.5 cm.

16. The sound-suppressing panel as claimed in claim 1 wherein there are at least three different cell sizes, and the cells are intermixed so that the fluid passing adjacent the cover sequentially encounters cells of differing sizes.

17. A sound-suppressing panel for use on a structure adjacent which a fluid is to flow and upon which sound waves impinge, comprising:
  (a) a top sheet forming a cover, adjacent which a fluid flow is adapted to pass and cause a boundary layer of fluid to be in direct contact with the cover, and said cover having a thickness within the range of about 0.025 cm to about 0.25 cm;
  (b) a rigid bottom sheet;
  (c) a plurality of walls extending generally transversely between the bottom sheet and the cover, and the walls having various orientations and intersecting one another at various locations so as to form a plurality of cells immediately below the cover, and there being at least three different sizes of cells ranging in volume from not less than 0.01 cm$^3$ to not more than 16 cm$^3$;
  (d) and there being a plurality of linear passages through the cover so as to permit the fluid flow to communicate directly with each of the cells below said cover, and the diameters of some of the passages leading into cells of a given size being different from the diameters of other passages leading into the same cell, and the length-to-diameter ratio of each of said passages being less than 10 but more than 1.

18. The sound-suppressing panel as claimed in claim 17 wherein there are linear passages through the cover whose diameters differ by a factor of at least two, and wherein the diameters of the linear passages range from 0.025 cm to 1.3 cm.

19. The sound-suppressing panel as claimed in claim 17 wherein the plurality of differently sized cells are organized in alternate rows of uniformly sized cells, with the cells of a respective row being substantially identical as viewed in a direction perpendicular to the flow of fluid over the cover, such that the fluid flow sequentially encounters cells of differing sizes.

20. The sound-suppressing panel as claimed in claim 17 wherein the linear passages terminate at the top of the cover in apertures, and the separation of the apertures is less than ten times the diameter of the smaller of any two adjacent apertures.

21. The sound-suppressing panel as claimed in claim 17 wherein the top and bottom sheets are separated by no more than about 2.5 cm, so that the cells have a depth of no more than about 2.5 cm, and wherein the walls are sealingly joined to both the top and bottom sheets, whereby each cell reacts independently to the pressure of the fluid passing over the cover.

* * * * *